(12) United States Patent
Itamoto et al.

(10) Patent No.: US 10,538,266 B2
(45) Date of Patent: Jan. 21, 2020

(54) STEERING CONTROL APPARATUS

(71) Applicant: JTEKT CORPORATION, Osaka-shi, Osaka (JP)

(72) Inventors: Hidenori Itamoto, Tajimi (JP); Takashi Kageyama, Okazaki (JP); Toshie Hibi, Okazaki (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 16/179,439

(22) Filed: Nov. 2, 2018

(65) Prior Publication Data
US 2019/0135335 A1 May 9, 2019

(30) Foreign Application Priority Data
Nov. 9, 2017 (JP) .................................. 2017-216724

(51) Int. Cl.
*B62D 5/04* (2006.01)
*H02P 27/12* (2006.01)
(Continued)

(52) U.S. Cl.
CPC ........... *B62D 5/0469* (2013.01); *B62D 5/046* (2013.01); *B62D 5/0463* (2013.01); *H02P 21/18* (2016.02); *H02P 21/22* (2016.02); *H02P 27/12* (2013.01)

(58) Field of Classification Search
CPC .... B62D 5/046; B62D 5/0463; B62D 5/0469; H02P 21/18; H02P 21/22; H02P 27/12
See application file for complete search history.

(56) References Cited

U.S. PATENT DOCUMENTS 6,026,926 A * 2/2000 Noro .................. B62D 5/0463
                                                              180/443
6,107,767 A * 8/2000 Lu ........................ B62D 5/046
                                                              318/432
(Continued)

FOREIGN PATENT DOCUMENTS

DE    10 2015 121 717 A1    6/2016
EP         2530829 A2        12/2012
(Continued)

OTHER PUBLICATIONS

Apr. 3, 2019 Extended European Search Report issued in European Patent Application No. 18204995.7.

*Primary Examiner* — Babar Sarwar
(74) *Attorney, Agent, or Firm* — Oliff PLC

(57) ABSTRACT

A current command value calculation circuit includes an end abutment determination circuit and a guard processing circuit. When a decrease amount of an induced voltage value within a predetermined time is equal to or larger than a predetermined decrease amount in the state that a steering torque is equal to or larger than a predetermined torque, the end abutment determination circuit determines that the end abutment occurs. When a determination signal indicating that the end abutment state does not occur is input, the guard processing circuit outputs an elemental current command value directly as a q-axis current command value. When a determination signal indicating that the end abutment state occurs is input, the guard processing circuit outputs, as the q-axis current command value, a value obtained by limiting the elemental current command value so that its absolute value is equal to or lower than a predetermined limit current value.

4 Claims, 5 Drawing Sheets

(51) Int. Cl.
*H02P 21/22* (2016.01)
*H02P 21/18* (2016.01)

(56) References Cited

U.S. PATENT DOCUMENTS

| | | | | |
|---|---|---|---|---|
| 6,112,846 | A * | 9/2000 | Mukai | B62D 5/0469 180/443 |
| 6,268,708 | B1 * | 7/2001 | Kawada | B62D 5/0469 318/258 |
| 6,326,758 | B1 * | 12/2001 | Discenzo | G05B 23/0243 318/432 |
| 6,564,897 | B2 * | 5/2003 | Dammeyer | B60T 11/21 180/402 |
| 7,294,988 | B2 * | 11/2007 | Ajima | B60K 6/26 318/712 |
| 7,663,330 | B2 * | 2/2010 | Yamazaki | B62D 5/0469 318/432 |
| 10,056,832 | B2 * | 8/2018 | Mizuno | H02M 3/156 |
| 2008/0035411 | A1 | 2/2008 | Yamashita et al. | |
| 2008/0199160 | A1 * | 8/2008 | Yamazaki | B62D 5/0469 388/815 |
| 2012/0259512 | A1 * | 10/2012 | Okada | B62D 5/0469 701/41 |
| 2014/0081524 | A1 * | 3/2014 | Tamaizumi | B62D 5/0469 701/42 |
| 2016/0167701 | A1 | 6/2016 | Sone | |
| 2019/0152514 | A1 * | 5/2019 | Itamoto | B62D 5/046 |

FOREIGN PATENT DOCUMENTS

| | | |
|---|---|---|
| JP | 2012-232624 A | 11/2012 |
| JP | 2016-113031 A | 6/2016 |
| WO | 2007/093875 A2 | 8/2007 |
| WO | WO-2007093875 A2 * | 8/2007 ........... B62D 5/0469 |
| WO | 2016/135923 A1 | 9/2016 |
| WO | 2017/047708 A1 | 3/2017 |

* cited by examiner

STEERING CONTROL APPARATUS

INCORPORATION BY REFERENCE

The disclosure of Japanese Patent Application No. 2017-216724 filed on Nov. 9, 2017 including the specification, drawings and abstract, is incorporated herein by reference in its entirety.

BACKGROUND OF THE INVENTION

1. Field of the Invention

The present invention relates to a steering control apparatus.

2. Description of the Related Art

Hitherto, there is known an electric power steering system (EPS) configured to apply a torque of a motor as an assist force based on a steering torque input to a steering mechanism of a vehicle. In recent years, a brushless motor has increasingly been employed as the motor serving as a drive source of the EPS. A steering control apparatus controls an operation of the motor based on its electrical angle detected by a rotation angle sensor such as a resolver as a relative angle within a range of 360°.

As this steering control apparatus, there is a steering control apparatus configured to execute sensorless control for controlling driving of the motor by using an estimated electrical angle that is estimated based on an induced voltage generated in the motor instead of using a detected electrical angle that is detected by the rotation angle sensor in the event of, for example, failure in the sensor (for example, Japanese Patent Application Publication No. 2016-113031 (JP 2016-113031 A) and Japanese Patent Application Publication No. 2012-232624 (JP 2012-232624 A)).

In the EPS, a steering angle at which the end of a rack shaft (rack end) that constitutes the steering mechanism abuts against a rack housing is mechanically defined in advance as an upper limit value of a turning angle of a steering wheel. In many cases, the rotation angle of the motor is detected as an absolute angle (absolute motor angle) within a range exceeding 360° by, for example, counting the number of revolutions of the motor with respect to a reference point (origin) corresponding to a rotation angle at a neutral steering position, and a rotation angle of a rotation shaft (control steering angle) that is convertible to a steered angle of each steered wheel is detected in association with the absolute motor angle. When the control steering angle is an angle near the end, application of an excessive stress to the steering mechanism is suppressed by executing, for example, compensation control for reducing the assist force.

The detection accuracy of the estimated electrical angle calculated based on the induced voltage is not as high as that of the detected electrical angle. Therefore, the control steering angle cannot be detected accurately during the execution of the sensorless control. As a result, for example, a significant assist force is applied from the motor in a state in which the rack end abuts against the rack housing. Thus, there is a possibility that an excessive stress is applied to the steering mechanism.

This phenomenon may occur not only during the execution of the sensorless control, but also during normal control in which the operation of the motor is controlled based on the detected electrical angle that is detected by the rotation angle sensor, for example, if an abnormality occurs such that the detected electrical angle deviates from an actual electrical angle.

SUMMARY OF THE INVENTION

It is one object of the present invention to provide a steering control apparatus in which an end abutment state can be detected when a control steering angle cannot be detected accurately.

One aspect of the present invention relates to a steering control apparatus configured to control a steering system in which an assist force for causing a steering operation shaft to reciprocate is applied to a steering mechanism by an assist mechanism having a motor as a drive source. The steering control apparatus includes a control circuit configured to control an operation of the motor so that the assist force is generated. The steering control apparatus includes an induced voltage value calculation circuit and an end abutment determination circuit. The induced voltage value calculation circuit is configured to calculate an induced voltage value generated in the motor. The end abutment determination circuit is configured to determine that an end abutment state in which axial movement of the steering operation shaft is restricted mechanically occurs when a decrease amount of the induced voltage value within a predetermined time is large in a state in which a steering torque detected by a torque sensor is equal to or larger than a predetermined torque that allows the steering operation shaft to reciprocate.

At the time of end abutment, the steering operation shaft moving in the axial direction by the input steering torque is suddenly stopped by mechanically restricting the axial movement of the steering operation shaft. At this time, the motor is suddenly stopped in a state in which the motor has been rotating in response to the axial movement of the steering operation shaft. Therefore, the induced voltage decreases significantly within a short time. In view of this fact, in the configuration described above, when the decrease amount of the induced voltage value within the predetermined time is large in the state in which the steering torque is equal to or larger than the predetermined torque, it is determined that the end abutment state occurs. Thus, it is possible to detect that the end abutment state occurs even when the control steering angle cannot be detected accurately.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
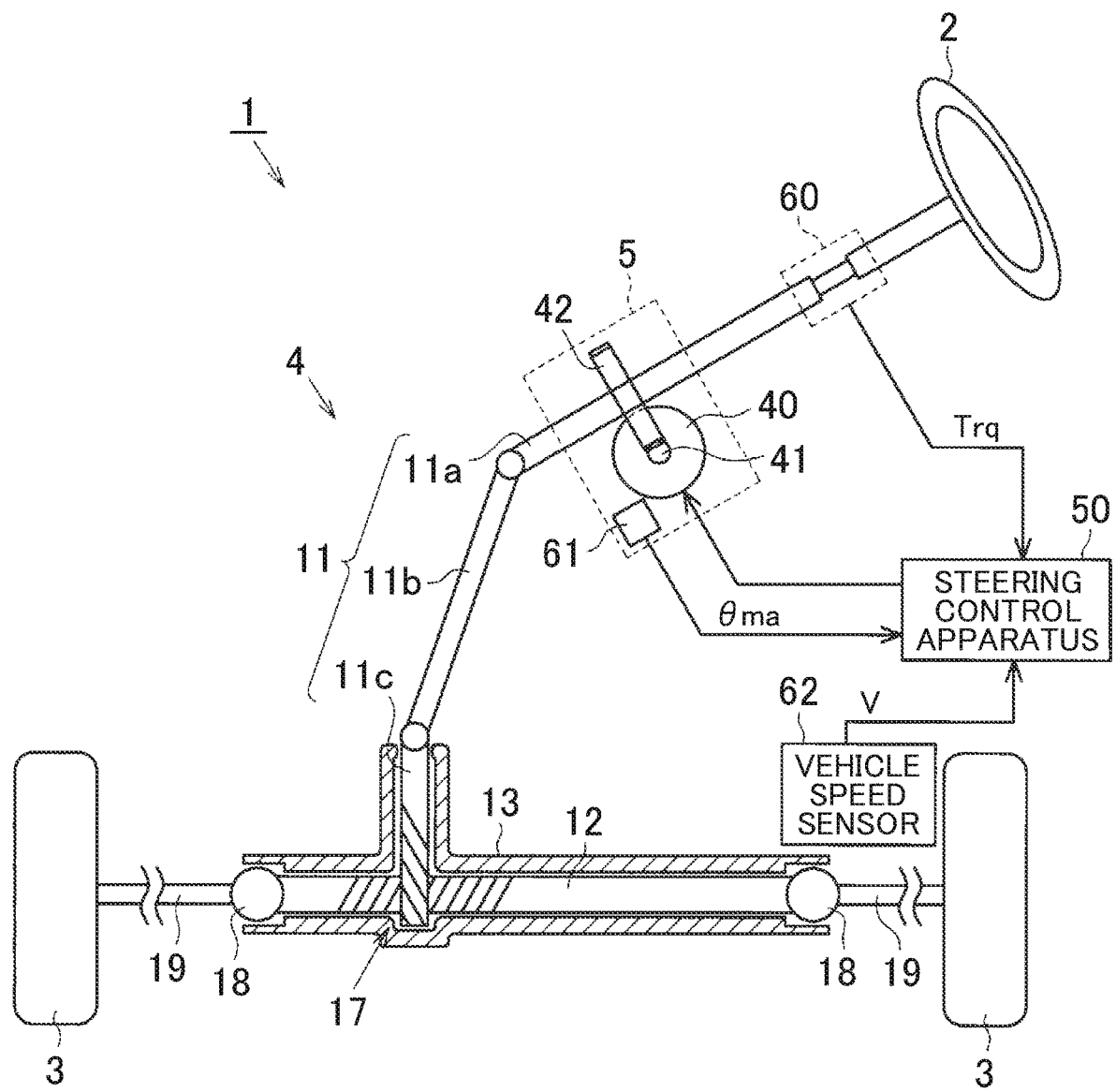
FIG. 1 is a schematic configuration diagram of an electric power steering system.

A steering control apparatus of one embodiment of the present invention is described below with reference to the drawings. As illustrated in FIG. 1, an electric power steering system (EPS) 1 that is a steering system to be controlled includes a steering mechanism 4 and an assist mechanism 5. The steering mechanism 4 turns steered wheels 3 based on a driver's operation of a steering wheel 2. The assist mechanism 5 applies an assist force to the steering mechanism 4 so as to assist the steering operation.

The steering mechanism 4 includes a steering shaft 11, a rack shaft 12, and a substantially cylindrical rack housing 13. The steering wheel 2 is fixed to the steering shaft 11. The rack shaft 12 serves as a steering operation shaft that reciprocates in an axial direction in response to rotation of the steering shaft 11. The rack shaft 12 is inserted through the rack housing 13 in a reciprocable manner. The steering shaft 11 is constructed by coupling a column shaft 11a, an intermediate shaft 11b, and a pinion shaft 11c together in this order from the steering wheel 2 side.

The rack shaft 12 and the pinion shaft 11c are arranged in the rack housing 13 at a predetermined crossing angle. A rack and pinion mechanism 17 is constructed by meshing rack teeth formed on the rack shaft 12 with pinion teeth formed on the pinion shaft 11c. Tie rods 19 are coupled to both ends of the rack shaft 12 in a freely rotatable manner via rack ends 18, respectively. The rack ends 18 are formed by ball joints provided at the axial ends of the rack shaft 12. The distal ends of the tie rods 19 are coupled to knuckles (not illustrated) to which the steered wheels 3 are attached, respectively. In the EPS 1, the rotation of the steering shaft 11 along with the steering operation is converted to axial movement of the rack shaft 12 by the rack and pinion mechanism 17, and the axial movement is transmitted to the knuckles via the tie rods 19, thereby changing steered angles of the steered wheels 3, that is, a traveling direction of the vehicle.

A position where the rack end 18 abuts against the left end of the rack housing 13 is a position where steering can be made maximally in a rightward direction. This position corresponds to a right rack end position. A position where the rack end 18 abuts against the right end of the rack housing 13 is a position where steering can be made maximally in a leftward direction. This position corresponds to a left rack end position. A state in which the rack shaft 12 is located at the right or left rack end position is an end abutment state in which the axial movement of the rack shaft 12 is restricted mechanically.

The assist mechanism 5 includes a motor 40 that is a source of power (assist force) to be applied to the steering mechanism 4. For example, the motor 40 is a brushless motor configured to rotate based on three-phase (U, V, and W) driving electric power. A rotation shaft 41 of the motor 40 is coupled to the column shaft 11a via a speed reducing mechanism 42. The assist mechanism 5 converts a rotational force of the rotation shaft 41 of the motor 40 to a force for causing the rack shaft 12 to perform reciprocating linear motion in the axial direction via the speed reducing mechanism 42. The axial force applied to the rack shaft 12 serves as a steering assist force (assist force) to change the steered angles of the steered wheels 3.

A steering control apparatus 50 is connected to the motor 40. The steering control apparatus 50 controls driving of the motor 40. The steering control apparatus 50 controls an operation of the motor 40 by controlling the supply of a current based on detection results from various sensors. The current is a control amount of the motor 40. Examples of various sensors include a torque sensor 60, a rotation angle sensor 61, and a vehicle speed sensor 62. The torque sensor 60 is provided on the column shaft 11a. The rotation angle sensor 61 is provided on the motor 40. The torque sensor 60 detects a steering torque Trq that is an operation condition amount generated in the steering shaft 11 along with a change through the driver's steering operation. The rotation angle sensor 61 detects a rotation angle of the rotation shaft 41 of the motor 40 as a detected electrical angle θma within a range of 360°. The vehicle speed sensor 62 detects a vehicle speed value V that is a traveling speed of the vehicle.

Next, the electrical configuration of the electric power steering system 1 is described.

Figure 2:
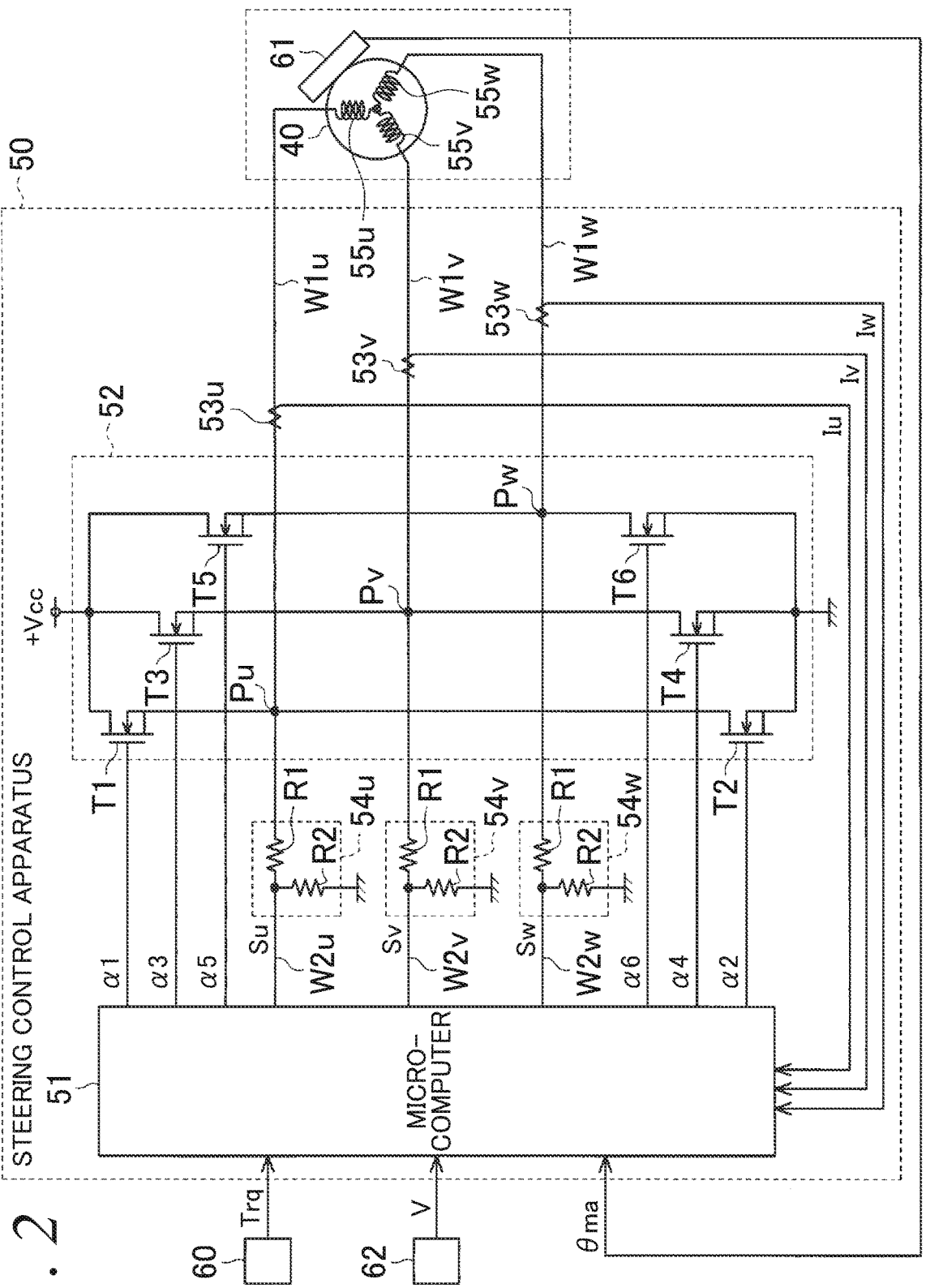
FIG. 2 is a block diagram of a steering control apparatus.

As illustrated in FIG. 2, the steering control apparatus 50 includes a microcomputer 51 and a drive circuit 52. The microcomputer 51 serves as a control circuit configured to generate a motor control signal necessary to drive the motor 40. The drive circuit 52 supplies a current to the motor 40 based on the motor control signal. The microcomputer 51 acquires detection results from the torque sensor 60, the rotation angle sensor 61, and the vehicle speed sensor 62. The microcomputer 51 also acquires current values Iu to Iw of respective phases of the motor 40 from current sensors 53u to 53w provided on power supply lines W1u to W1w between the drive circuit 52 and the motor 40. The microcomputer 51 also acquires detection signals Su to Sw indicating terminal voltage values Vu to Vw of the respective phases of the motor 40 from voltage sensors 54u to 54w provided on signal lines W2u to W2w between the microcomputer 51 and the drive circuit 52. Based on the respective condition amounts, the microcomputer 51 generates motor control signals as pulse width modulation (PWM) drive signals α1 to α6 for causing the drive circuit 52 to execute PWM drive, and outputs the PWM drive signals α1 to α6 to the drive circuit 52.

The drive circuit 52 includes a plurality of switching elements T1 to T6. The drive circuit 52 of this embodiment is constructed as a known three-phase inverter in which series circuits corresponding to a pair of the switching elements T1 and T2, a pair of the switching elements T3 and T4, and a pair of the switching elements T5 and T6 are defined as basic units (switching arms) and the respective switching arms are connected in parallel. A middle point Pu between the switching elements T1 and T2, a middle point Pv between the switching elements T3 and T4, and a middle point Pw between the switching elements T5 and T6 are connected to coils 55u to 55w of the respective phases of the motor 40 via the power supply lines W1u to W1w. In the drive circuit 52, a direct current (DC) voltage supplied from a DC power supply (power supply voltage "+Vcc") is converted to three-phase alternating current (AC) voltages by switching ON/OFF of the switching elements T1 to T6 based on the PWM drive signals α1 to α6 output from the microcomputer 51. The three-phase AC voltages obtained through the conversion are supplied to the coils 55u to 55w of the respective phases of the motor 40 via the power supply lines W1u to W1w, thereby driving the motor 40.

The voltage sensors 54u to 54w are connected to the middle points Pu to Pw of the switching elements T1 to T6, respectively. The voltage sensors 54u to 54w divide detection values of terminal voltages of the respective phases through voltage division resistors R1 and R2, and output values obtained through the voltage division to the microcomputer 51 via the signal lines W2u to W2w as the detection signals Su to Sw.

Next, functions of the microcomputer 51 are described in detail. The microcomputer 51 includes a central processing unit (CPU) and a memory that are not illustrated, and controls the operation of the motor 40 such that the CPU executes a program stored in the memory repeatedly in predetermined control periods.

Figure 3:
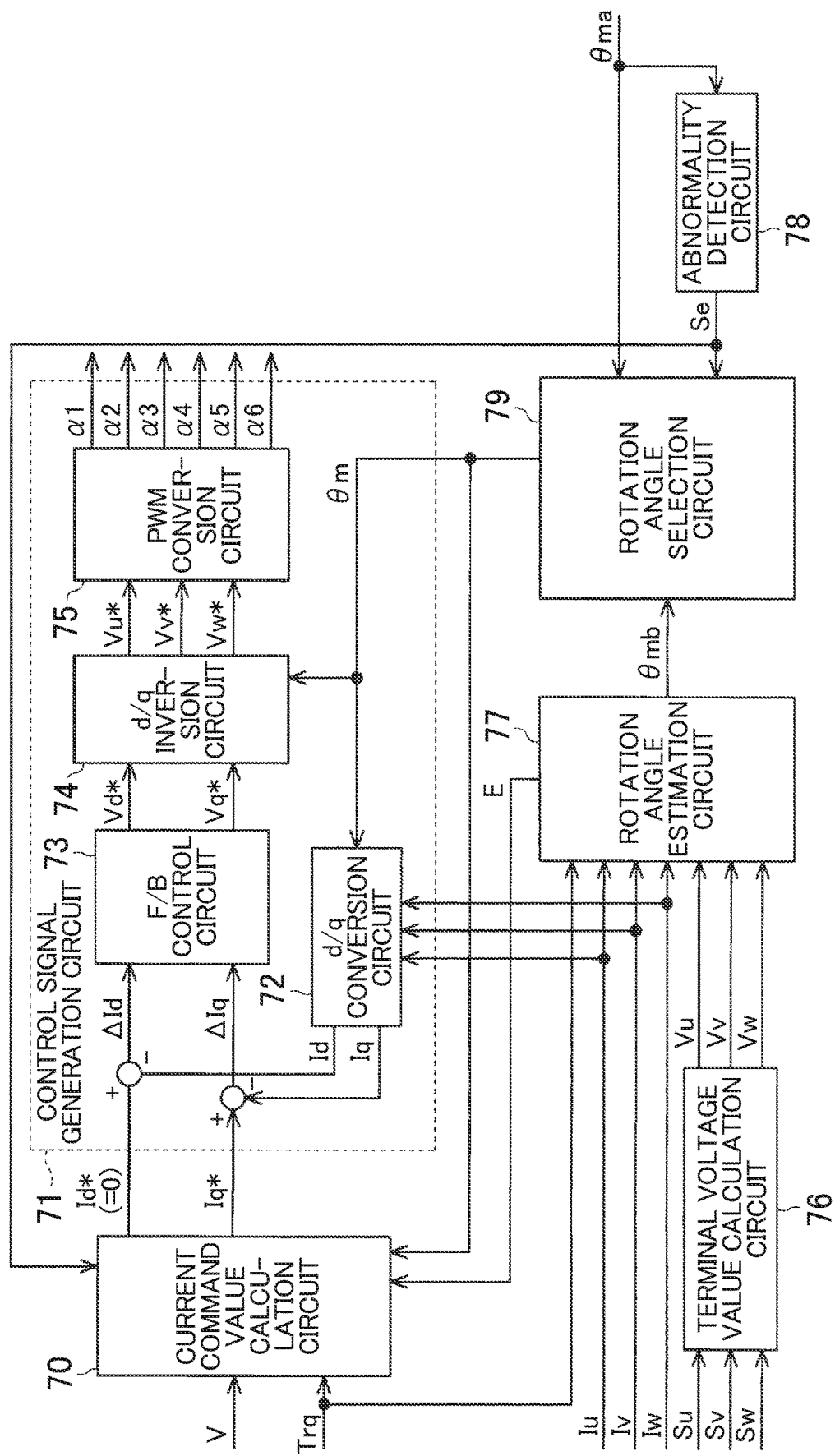
FIG. 3 is a block diagram of a microcomputer.

As illustrated in FIG. 3, the microcomputer 51 includes a current command value calculation circuit 70 and a control signal generation circuit 71. The current command value calculation circuit 70 calculates current command values Id* and Iq* that are target values of a current amount corresponding to a target assist force to be generated in the motor 40. The control signal generation circuit 71 generates the PWM drive signals α1 to α6 corresponding to the current command values Id* and Iq*.

The vehicle speed value V and the steering torque Trq are input to the current command value calculation circuit 70. As described later, an electrical angle θm, an induced voltage value E, and an abnormality detection signal Se are input to the current command value calculation circuit 70. As described later, the current command value calculation circuit 70 calculates the q-axis current command value Iq* based on the respective condition amounts. The q-axis current command value Iq* is a current command value on a q-axis in a d/q coordinate system. In this embodiment, the d-axis current command value Id* is fixed to zero.

The q-axis current command value Iq* and the d-axis current command value Id* generated by the current command value calculation circuit 70, the current values Iu to Iw of the respective phases, and the electrical angle θm are input to the control signal generation circuit 71. The control signal generation circuit 71 generates the PWM drive signals α1 to α6 through execution of current feedback control based on the current values Iu to Iw of the respective phases and the electrical angle θm so that actual current values of the motor 40 follow the q-axis current command value Iq*. The control signal generation circuit 71 outputs the PWM drive signals α1 to α6 to the drive circuit 52. One of the detected electrical angle θma and an estimated electrical angle θmb is input as the electrical angle θm. The detected electrical angle θma is the detection result from the rotation angle sensor 61. The estimated electrical angle θmb is calculated by a rotation angle estimation circuit 77 described later.

Specifically, the control signal generation circuit 71 includes a d/q conversion circuit 72, a feedback control circuit (hereinafter referred to as "F/B control circuit") 73, a d/q inversion circuit 74, and a PWM conversion circuit 75. The current values Iu to Iw of the respective phases and the electrical angle θm are input to the d/q conversion circuit 72. The d/q conversion circuit 72 calculates a d-axis current value Id and a q-axis current value Iq by mapping the current values Iu to Iw of the respective phases on the d/q coordinates based on the electrical angle θm. The d-axis current value Id and the q-axis current value Iq are actual current values of the motor 40 in the d/q coordinate system.

Current deviations ΔId and ΔIq are input to the F/B control circuit 73. The current deviations ΔId and ΔIq are obtained by subtracting the d-axis current value Id and the q-axis current value Iq generated through the processing executed by the d/q conversion circuit 72 from the d-axis current command value Id* and the q-axis current command value Iq* generated through the processing executed by the current command value calculation circuit 70, respectively. The F/B control circuit 73 calculates a d-axis voltage command value Vd* and a q-axis voltage command value Vq* by executing current feedback control based on the current deviations ΔId and ΔIq so that the d-axis current value Id and the q-axis current value Iq follow the d-axis current command value Id* and the q-axis current command value Iq*, respectively.

The d-axis voltage command value Vd* and the q-axis voltage command value Vq* generated through the processing executed by the F/B control circuit 73 and the electrical angle θm are input to the d/q inversion circuit 74. The d/q inversion circuit 74 calculates voltage command values Vu* to Vw* of the respective phases by mapping the d-axis voltage command value Vd* and the q-axis voltage command value Vq* on a three-phase AC coordinate system based on the electrical angle θm.

The voltage command values Vu* to Vw* of the respective phases that are generated through the processing executed by the d/q inversion circuit 74 are input to the PWM conversion circuit 75. The PWM conversion circuit 75 generates the PWM drive signals α1 to α6 by executing PWM conversion for the voltage command values Vu* to Vw* of the respective phases. The PWM drive signals α1 to α6 are applied to gate terminals of the corresponding switching elements T1 to T6 of the drive circuit 52. Thus, an assist force obtained based on the current command values Id* and Iq* is applied to the steering mechanism 4.

When an abnormality occurs such that a normal value cannot be detected by the rotation angle sensor 61, the microcomputer 51 of this embodiment executes sensorless control as backup control so as to continuously control the operation of the motor 40 by using the estimated electrical angle θmb that is estimated based on calculation instead of using the detected electrical angle θma.

Specifically, the microcomputer 51 includes a terminal voltage value calculation circuit 76, the rotation angle estimation circuit 77, an abnormality detection circuit 78, and a rotation angle selection circuit 79. The detection signals Su to Sw of the voltage sensors 54u to 54w are input to the terminal voltage value calculation circuit 76. The terminal voltage value calculation circuit 76 calculates the terminal voltage values Vu to Vw of the respective phases of the motor 40 based on the detection signals Su to Sw.

The terminal voltage values Vu to Vw of the respective phases that are generated through the processing executed by the terminal voltage value calculation circuit 76, the steering torque Trq, and the current values Iu to Iw of the respective phases are input to the rotation angle estimation circuit 77. The rotation angle estimation circuit 77 calculates the estimated electrical angle θmb as described later based on the terminal voltage values Vu to Vw of the respective phases, the steering torque Trq, and the current values Iu to Iw of the respective phases.

The detected electrical angle θma is input to the abnormality detection circuit 78. The abnormality detection circuit 78 generates the abnormality detection signal Se based on the detected electrical angle θma. The abnormality detection signal Se indicates that an abnormality occurs such that a normal value cannot be detected by the rotation angle sensor 61. For example, the abnormality detection circuit 78 detects the abnormality when the absolute value of a difference between a current value and a previous value of the detected electrical angle θma deviates from a predetermined permissible range. The permissible range is set to a range in which the abnormality can be detected in consideration of the control period of the microcomputer 51 or a sensor tolerance of the rotation angle sensor 61.

The estimated electrical angle θmb generated through the processing executed by the rotation angle estimation circuit 77, the abnormality detection signal Se generated through the processing executed by the abnormality detection circuit 78, and the detected electrical angle θma are input to the rotation angle selection circuit 79. When no abnormality occurs in the rotation angle sensor 61 because the abnormality detection signal Se indicating that an abnormality occurs is not input, the rotation angle selection circuit 79 generates the detected electrical angle θma as the electrical angle θm. In this case, the control signal generation circuit 71 executes various types of calculation by using the detected electrical angle θma as the electrical angle θm.

When an abnormality occurs in the rotation angle sensor 61 because the abnormality detection signal Se indicating that an abnormality occurs is input, the rotation angle selection circuit 79 generates the estimated electrical angle θmb as the electrical angle θm instead of using, as the control electrical angle, the detected electrical angle θma that is the detection result from the rotation angle sensor 61. In this case, the control signal generation circuit 71 executes various types of calculation by using the estimated electrical angle θmb as the electrical angle θm.

Figure 4:
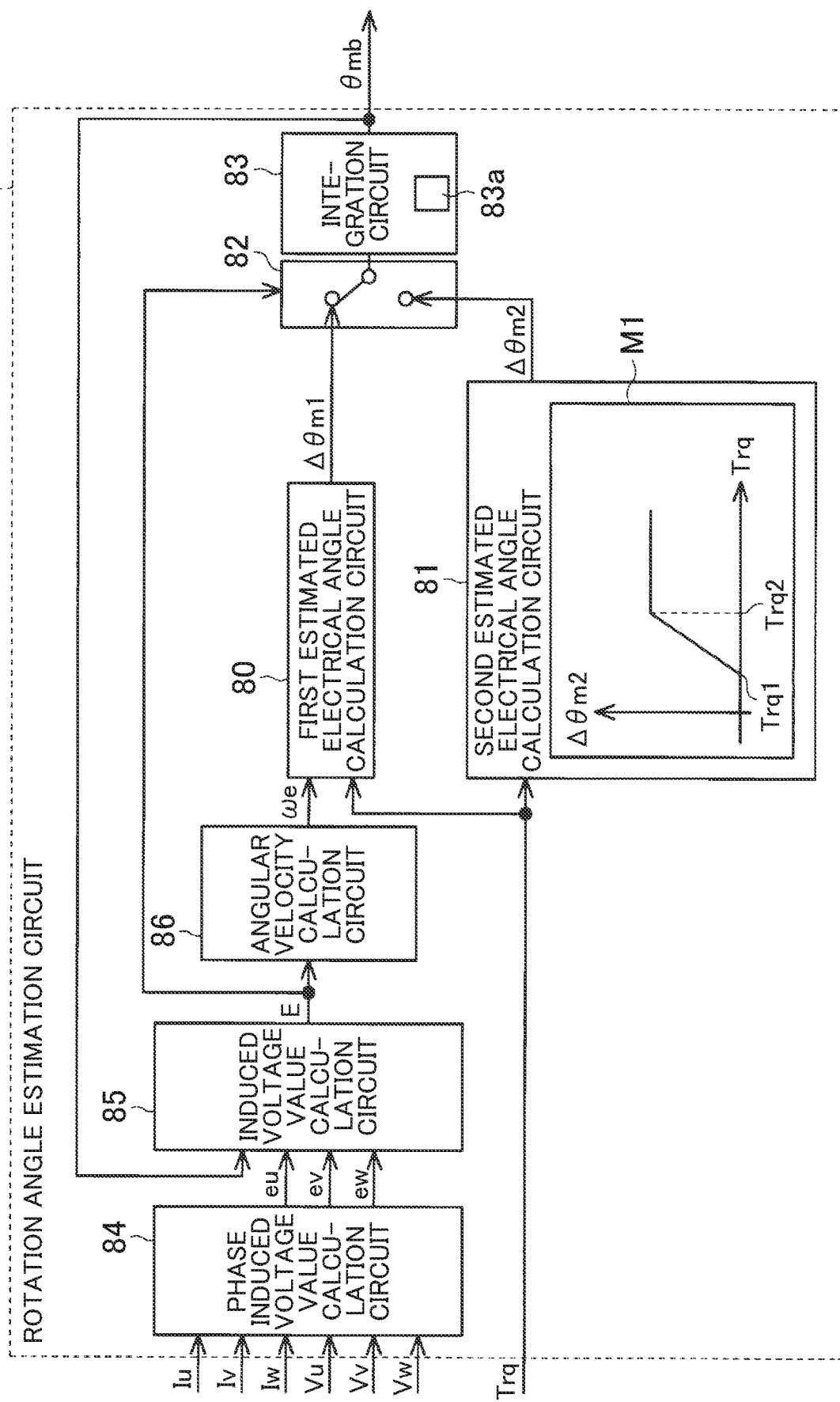
FIG. 4 is a block diagram of a rotation angle estimation circuit.

Next, the configuration of the rotation angle estimation circuit 77 is described in detail. As illustrated in FIG. 4, the rotation angle estimation circuit 77 includes a first estimated electrical angle calculation circuit 80 and a second estimated electrical angle calculation circuit 81. The first estimated electrical angle calculation circuit 80 calculates a first addition angle Δθm1 so as to estimate the estimated electrical angle θmb based on an induced voltage generated in the motor 40 (induced voltage value E). The second estimated electrical angle calculation circuit 81 calculates a second addition angle Δθm2 so as to estimate the estimated electrical angle θmb based on the steering torque Trq. The rotation angle estimation circuit 77 further includes a switching circuit 82 and an integration circuit 83. The switching circuit 82 executes switching so as to determine which of the calculation results of the first estimated electrical angle calculation circuit 80 and the second estimated electrical angle calculation circuit 81 is used to calculate the estimated electrical angle θmb. The integration circuit 83 calculates the estimated electrical angle θmb by integrating one of the first addition angle Δθm1 and the second addition angle Δθm2.

Specifically, the rotation angle estimation circuit 77 includes a phase induced voltage value calculation circuit 84 and an induced voltage value calculation circuit 85 for calculating the induced voltage value E. The current values Iu to Iw of the respective phases and the terminal voltage values Vu to Vw of the respective phases are input to the phase induced voltage value calculation circuit 84. The phase induced voltage value calculation circuit 84 calculates induced voltage values eu, ev, and ew of the respective phases in the three-phase AC coordinate system based on the current values Iu to Iw of the respective phases and the terminal voltage values Vu to Vw of the respective phases. The phase induced voltage value calculation circuit 84 calculates the induced voltage values eu, ev, and ew of the respective phases in consideration of resistance values of the coils 55$u$ to 55$w$ of the respective phases of the motor 40. The induced voltage values eu, ev, and ew of the respective phases that are generated through the processing executed by the phase induced voltage value calculation circuit 84 and a previous value of the estimated electrical angle θmb (value calculated earlier by one control period) are input to the induced voltage value calculation circuit 85. The induced voltage value calculation circuit 85 calculates two-phase induced voltage values ed and eq by converting the induced voltage values eu, ev, and ew of the respective phases to values in the d/q coordinate system based on the previous value of the estimated electrical angle θmb. Then, the induced voltage value calculation circuit 85 calculates the induced voltage value (absolute value) E as a square root of the sum of squares of the two-phase induced voltage values ed and eq.

The rotation angle estimation circuit 77 further includes an angular velocity calculation circuit 86. The induced voltage value E generated through the processing executed by the induced voltage value calculation circuit 85 is input to the angular velocity calculation circuit 86. The angular velocity calculation circuit 86 calculates an estimated angular velocity ωe based on the induced voltage value E. The estimated angular velocity ωe is an estimated value of an angular velocity, that is, a rotation speed of the motor 40 that is a change in the detected electrical angle θma of the motor 40. The angular velocity calculation circuit 86 outputs the estimated angular velocity ωe to the first estimated electrical angle calculation circuit 80. There is a proportional relationship between the induced voltage value E and the estimated angular velocity ωe. Therefore, the estimated angular velocity ωe is a value obtained by dividing the induced voltage value E by a predefined induced voltage constant (counter-electromotive force constant).

The first estimated electrical angle calculation circuit 80 calculates the first addition angle Δθm1 based on the estimated angular velocity ωe. The first addition angle Δθm1 indicates an addition amount that is a change amount of the estimated electrical angle θmb in one control period. The steering torque Trq is also input to the first estimated electrical angle calculation circuit 80 of this embodiment. The first estimated electrical angle calculation circuit 80 sets the positive or negative sign of the first addition angle Δθm1 while the positive or negative sign of the steering torque Trq is assumed to be a rotation direction of the motor 40.

The steering torque Trq is input to the second estimated electrical angle calculation circuit 81. The second estimated electrical angle calculation circuit 81 generates the second addition angle Δθm2 through calculation based on the steering torque Trq. The second addition angle Δθm2 indicates an addition amount that is a change amount of the estimated electrical angle δmb in one control period. Specifically, the second estimated electrical angle calculation circuit 81 is provided with a map M1 indicating a relationship between the steering torque Trq and the second addition angle Δθm2. The second estimated electrical angle calculation circuit 81 calculates the second addition angle Δθm2 by referring to the map M1, and sets the positive or negative sign of the second addition angle Δθm2 based on the positive or negative sign of the steering torque Trq. As an example of the map M1, the second addition angle Δθm2 is zero in a range in which the steering torque Trq (absolute value) is equal to or smaller than a predetermined first torque Trq1. The second addition angle Δθm2 increases in proportion to an increase in the steering torque Trq in a range in which the steering torque Trq is larger than the first torque Trq1 and is equal to or smaller than a second torque Trq2. The second addition angle Δθm2 is a constant value in a range in which the steering torque Trq is larger than the second torque Trq2.

The induced voltage value E generated through the processing executed by the induced voltage value calculation circuit 85 is input to the switching circuit 82. When the induced voltage value E is higher than a threshold voltage value Eth (positive value), the switching circuit 82 makes a setting so that the first addition angle Δθm1 is added to the estimated electrical angle θmb. When the induced voltage value E is equal to or lower than the threshold voltage value Eth, the switching circuit 82 makes a setting so that the second addition angle Δθm2 is added to the estimated electrical angle θmb. The threshold voltage value Eth of this embodiment is set to a value within a range that is empirically determined under the assumption of a low steering speed state in which a driver's steering speed ωs is low. The steering speed ωs corresponds to the estimated angular velocity ωe calculated based on the induced voltage value E. That is, the low steering speed state that is a situation in which the induced voltage value E is a given value equal to or lower than the threshold voltage value Eth is assumed to be a state in which the accuracy of estimation of the estimated electrical angle θmb based on the induced voltage value E is low because the induced voltage value E is low.

A normal steering speed state (non-low steering speed state) that is not the low steering speed state but is a situation in which the induced voltage value E is not the given value described above but is a value higher than the threshold voltage value Eth is assumed to be a state in which the accuracy of estimation of the estimated electrical angle θmb based on the induced voltage value E is high (not low) because the induced voltage value E is high.

One of the first addition angle Δθm1 and the second addition angle Δθm2 that is set through the processing executed by the switching circuit 82 is input to the integration circuit 83. The integration circuit 83 generates the estimated electrical angle θmb through calculation by integrating the addition angle set by the switching circuit 82 with the previous value of the estimated electrical angle θmb (value obtained earlier by one control period) that is stored in a storage circuit 83a.

Thus, when an abnormality occurs in the rotation angle sensor 61 while controlling the driving of the motor 40, the microcomputer 51 executes the sensorless control by calculating the estimated electrical angle θmb through the processing executed by the rotation angle estimation circuit 77 repeatedly in the control periods.

Figure 5:
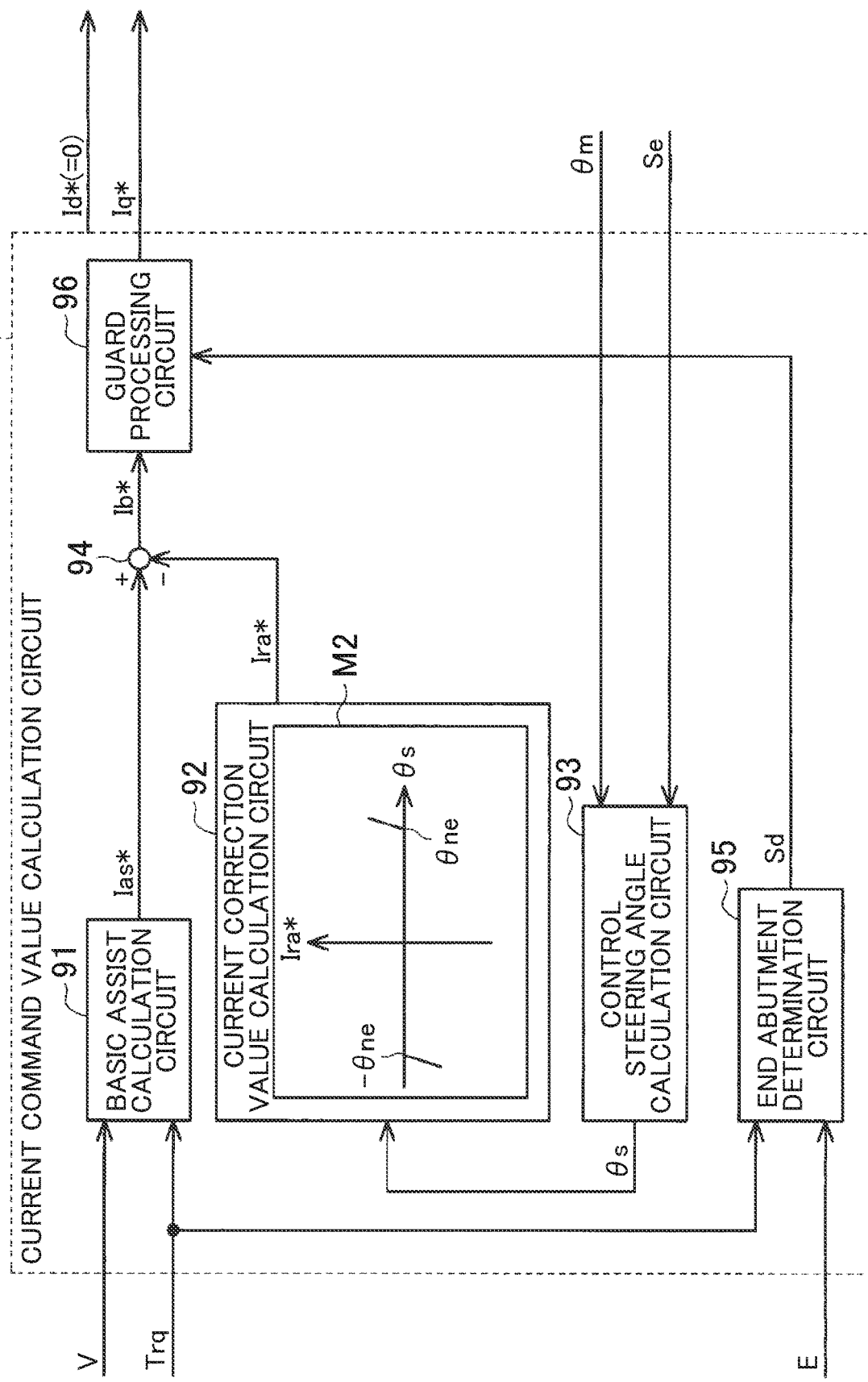
FIG. 5 is a block diagram of a current command value calculation circuit.

Next, the configuration of the current command value calculation circuit 70 is described in detail. As illustrated in FIG. 5, the current command value calculation circuit 70 includes a basic assist calculation circuit 91 and a current correction value calculation circuit 92. The basic assist calculation circuit 91 calculates a basic current command value Ias* that is a basic component of the q-axis current command value Iq*. The current correction value calculation circuit 92 calculates a current correction value Ira* for the basic current command value Ias*. The current command value calculation circuit 70 further includes a control steering angle calculation circuit 93 configured to calculate a control steering angle θs based on the electrical angle θm. The control steering angle θs is represented by an absolute angle within a range exceeding 360°.

The electrical angle θm and the abnormality detection signal Se are input to the control steering angle calculation circuit 93. When no abnormality occurs in the rotation angle sensor 61 because the abnormality detection signal Se indicating that an abnormality occurs is not input, the control steering angle calculation circuit 93 calculates the control steering angle θs by, for example, integrating (counting) the number of revolutions of the motor 40 with respect to an origin (0°) corresponding to an angle at a neutral steering position of the rack shaft 12 and adding a value indicated by the electrical angle θm. When an abnormality occurs in the rotation angle sensor 61 because the abnormality detection signal Se indicating that an abnormality occurs is input, that is, when the sensorless control is executed, the control steering angle calculation circuit 93 does not calculate the control steering angle θs.

The steering torque Trq and the vehicle speed value V are input to the basic assist calculation circuit 91. The basic assist calculation circuit 91 calculates the basic current command value Ias* based on the steering torque Trq and the vehicle speed value V. Specifically, the basic assist calculation circuit 91 calculates a basic current command value Ias* that is a higher value (absolute value) as the absolute value of the steering torque Trq increases and as the vehicle speed value V decreases. The basic current command value Ias* calculated in this manner is input to a subtractor 94.

The control steering angle θs is input to the current correction value calculation circuit 92. The current correction value calculation circuit 92 calculates the current correction value Ira* based on the control steering angle θs output from the control steering angle calculation circuit 93. When the control steering angle θs is not output from the control steering angle calculation circuit 93, the current correction value calculation circuit 92 does not calculate the current correction value Ira*, or outputs zero as the current correction value Ira*. The current correction value Ira* is a correction component for correcting the basic current command value Ias* so that a steering reaction force is applied to the steering shaft 11. End abutment alleviation control for alleviating a shock of end abutment is executed by outputting the current correction value Ira*.

Specifically, the current correction value calculation circuit 92 is provided with a map M2 indicating a relationship between the control steering angle θs and the current correction value Ira*. The current correction value calculation circuit 92 calculates the current correction value Ira* by referring to the map M2. As an example of the map M2, the current correction value Ira* is zero when the absolute value of the control steering angle θs is lower than the absolute value of a steering angle θne near the rack end position. When the absolute value of the control steering angle θs is equal to or higher than the absolute value of the steering angle θne near the rack end position, the absolute value of the current correction value Ira* increases as the absolute value of the control steering angle θs increases. The current correction value Ira* calculated in this manner is input to the subtractor 94.

The subtractor 94 calculates an elemental current command value Ib* by subtracting the current correction value Ira* calculated by the current correction value calculation circuit 92 from the basic current command value Ias* calculated by the basic assist calculation circuit 91.

The current command value calculation circuit 70 further includes an end abutment determination circuit 95 and a guard processing circuit 96 serving as a compensation circuit. The steering torque Trq and the induced voltage value E are input to the end abutment determination circuit 95. When a decrease amount ΔE of the induced voltage value E within a predetermined time is equal to or larger than a predetermined decrease amount ΔEth in a state in which the steering torque Trq is equal to or larger than a predetermined torque Tth, the end abutment determination circuit 95 determines that the end abutment state occurs. The predetermined torque Tth is a large torque that allows the rack shaft 12 to reciprocate when applied to the steering mechanism 4. The predetermined torque Tth is set in advance. For example, the predetermined time corresponds to one control period or a plurality of control periods, and is set to a very short time. The predetermined decrease amount ΔEth is a voltage change amount to be generated when the rotating motor 40 is brought into a stopped state or a state in which the number of revolutions is sufficiently low by mechanically restricting the rotation of the motor 40. The predetermined decrease amount ΔEth is set in advance. The end abutment determination circuit 95 outputs a determination signal Sd to the guard processing circuit 96. The determination signal Sd indicates a result of the end abutment determination.

When a determination signal Sd indicating that the end abutment state occurs is output once and, for example, the sign of the steering torque Trq (driver's steering direction) is changed, the end abutment determination circuit 95 outputs a determination signal Sd indicating that the end abutment state does not occur.

The elemental current command value Ib* and the determination signal Sd are input to the guard processing circuit 96. When the determination signal Sd indicating that the end abutment state does not occur is input, the guard processing circuit 96 outputs the elemental current command value Ib* directly as the q-axis current command value Iq*. When the determination signal Sd indicating that the end abutment state occurs is input, the guard processing circuit 96 outputs, as the q-axis current command value Iq*, a value obtained by limiting the elemental current command value Ib* so that its absolute value is equal to or lower than a predetermined limit current value Ilim. The predetermined limit current value Ilim is a current value corresponding to an assist force that prevents an excessive stress from being applied to the steering mechanism 4 even when the assist force is applied to the steering mechanism 4 in the end abutment state. The predetermined limit current value Ilim is suitably set to zero.

As described above, according to this embodiment, the following actions and effects can be attained.

(1) At the time of end abutment, the rack shaft 12 moving in the axial direction by the input steering torque is suddenly stopped by mechanically restricting the axial movement of the rack shaft 12. At this time, the motor 40 is suddenly stopped in a state in which the motor 40 has been rotating in response to the axial movement of the rack shaft 12. Therefore, the induced voltage decreases significantly within a short time. In view of this fact, when the decrease amount $\Delta E$ of the induced voltage value E within the predetermined time is large in the state in which the steering torque Trq is equal to or larger than the predetermined torque Tth, the end abutment determination circuit 95 determines that the end abutment state occurs. Thus, it is possible to determine that the end abutment state occurs when the control steering angle $\theta s$ cannot be detected accurately.

(2) When it is determined that the end abutment state occurs, the guard processing circuit 96 outputs, as the q-axis current command value Iq*, the value obtained by limiting the elemental current command value Ib* so that its absolute value is equal to or lower than the predetermined limit current value Ilim. Thus, it is possible to, for example, suppress the application of an excessive stress to the steering mechanism 4 due to the application of a significant assist force in the end abutment state.

(3) The end abutment determination circuit 95 makes the end abutment determination based on the steering torque Trq and the induced voltage value E during the execution of the sensorless control. In many cases, the detection accuracy of the estimated electrical angle $\theta mb$ calculated based on the induced voltage value E is not as high as the detection accuracy of the detected electrical angle $\theta ma$ that is detected by the rotation angle sensor 61. Therefore, the control steering angle $\theta s$ cannot be detected accurately during the execution of the sensorless control. Thus, it is highly effective to apply the configuration in which the end abutment determination is made based on the steering torque Trq and the induced voltage value E during the execution of the sensorless control as in this embodiment.

(4) When the decrease amount $\Delta E$ of the induced voltage value E within the predetermined time is equal to or larger than the predetermined decrease amount $\Delta E th$, the end abutment determination circuit 95 determines that the induced voltage value E decreases significantly. Thus, it is possible to appropriately determine that the induced voltage value E decreases significantly within the predetermined time.

The embodiment described above may be modified as appropriate in the following manner. In the embodiment described above, it is determined that the end abutment state occurs when the decrease amount $\Delta E$ of the induced voltage value E within the predetermined time is equal to or larger than the predetermined decrease amount $\Delta E th$ in the state in which the steering torque Trq is equal to or larger than the predetermined torque Tth. The present invention is not limited to this case. It may be determined that the end abutment state occurs, for example, when an estimated angular acceleration $\alpha e$ is equal to or lower than an angular acceleration threshold $\alpha th$ in the state in which the steering torque Trq is equal to or larger than the predetermined torque Tth. The estimated angular acceleration $\alpha e$ is a first-order time derivative of the estimated angular velocity $\omega e$ obtained by dividing the induced voltage value E by the induced voltage constant. The angular acceleration threshold $\alpha th$ indicates a significant decrease in the acceleration. In short, the determination method may be changed as appropriate as long as it can be determined that the induced voltage value E decreases significantly within the predetermined time in the state in which the steering torque Trq is equal to or larger than the predetermined torque Tth.

In the embodiment described above, the end abutment determination is made during the execution of the sensorless control. The present invention is not limited to this case. For example, the end abutment determination may be made also when no abnormality occurs in the rotation angle sensor 61 because the abnormality detection signal Se is not input. That is, the end abutment determination may be made also during normal control.

In the embodiment described above, when it is determined that the end abutment state occurs, the guard processing circuit 96 executes compensation control for limiting the elemental current command value Ib* so that its absolute value is equal to or lower than the predetermined limit current value Ilim, thereby reducing the assist force as compared to the case of determination that the end abutment state does not occur. The present invention is not limited to this case. For example, when it is determined that the end abutment state occurs, the assist force may be reduced by adding a reaction force command value of the steering reaction force to the elemental current command value Ib*. In this case, the assist force may be applied in a direction opposite to the driver's steering direction by reversing the sign of the q-axis current command value Iq*.

In the embodiment described above, the compensation control for reducing the assist force is executed when it is determined that the end abutment state occurs. The present invention is not limited to this case. For example, an alert lamp may be turned ON to only notify the driver that the end abutment state occurs, and the assist force need not be reduced.

In the embodiment described above, the operation of the motor 40 may be controlled by using the estimated electrical angle $\theta mb$ during the normal control in which the rotation angle sensor 61 operates properly. Further, the operation of the motor 40 may be controlled by using the estimated electrical angle θmb without using (including) the rotation angle sensor 61.

The embodiment described above is implemented by the electric power steering system 1 of the type in which the assist force is applied to the column shaft 11*a*. The embodiment may be applied to an electric power steering system of a rack assist type in which power is applied to the rack shaft 12.

The modified examples described above may be applied in combination. For example, the application to an electric power steering system of a rack assist type may be combined with the configurations of the other modified examples.

What is claimed is:

1. A steering control apparatus configured to control a steering system in which an assist force for causing a steering operation shaft to reciprocate is applied to a steering mechanism by an assist mechanism having a motor as a drive source, the steering control apparatus including a control circuit configured to control an operation of the motor so that the assist force is generated, the steering control apparatus comprising:
    an induced voltage value calculation circuit configured to calculate an induced voltage value generated in the motor; and
    an end abutment determination circuit configured to determine that an end abutment state in which axial movement of the steering operation shaft is mechanically restricted occurs when a decrease amount by which the induced voltage value drops within a predetermined time is greater than or equal to a threshold in a state in which a steering torque detected by a torque sensor is equal to or larger than a predetermined torque that allows the steering operation shaft to reciprocate.

2. The steering control apparatus according to claim 1, wherein the control circuit includes a compensation circuit configured to execute, when it is determined that the end abutment state occurs, compensation control for reducing a target assist force to be generated in the motor as compared to a case where it is not determined that the end abutment state occurs.

3. The steering control apparatus according to claim 1, further comprising a rotation angle estimation circuit configured to calculate an estimated electrical angle of the motor based on the induced voltage value, wherein
    the control circuit is configured to execute sensorless control for controlling the operation of the motor based on the estimated electrical angle calculated by the rotation angle estimation circuit, and
    the end abutment determination circuit is configured to make end abutment determination based on the steering torque and the induced voltage value during execution of the sensorless control.

4. The steering control apparatus according to claim 1, wherein the end abutment determination circuit is configured to determine that the end abutment state occurs when the decrease amount by which the induced voltage value drops within the predetermined time is greater than or equal to the threshold which represents a predetermined decrease amount indicating that a rotation speed of the motor changes suddenly.

* * * * *